Feb. 20, 1934. M. P. H. L. RAEPSAET 1,948,046
PROCESS FOR THE MANUFACTURE OF ARTICLES OF CELLULAR
RUBBER AND EBONITE WITH CLOSED CELLS
Filed Aug. 24, 1931

Patented Feb. 20, 1934

1,948,046

UNITED STATES PATENT OFFICE 1,948,046

PROCESS FOR THE MANUFACTURE OF ARTICLES OF CELLULAR RUBBER AND EBONITE WITH CLOSED CELLS

Maurice Paul Henri Leon Raepsaet, Aurec-sur-Loire, France, assignor to Societe Belge du Caoutchouc Mousse, Berchem-Ste-Agathe near Brussels, Belgium, a corporation of Belgium Application August 24, 1931, Serial No. 559,101, and in Germany July 7, 1931

10 Claims. (Cl. 18—53)

It is known that articles of cellular rubber and ebonite, with closed cells are manufactured from suitable mixtures of natural rubber and other suitable materials containing vulcanizing agents, by vulcanizing rough castings of said articles imprisoned in their moulds in the presence of a gas under high pressure.

After vulcanizing the articles are taken out of the mould thus enabling the gas under high pressure, which forms an infinite number of minute independent cells in the interior of the mass, to impart a considerable expansion to the mass. As a rule, if the article be allowed to expand freely after leaving the mould it does not retain the regular shape desired, and to remedy this defect the expansion may be allowed to take place in a heated mould of the desired final dimensions, thereby permitting the gases contained in the cells to expand and the article to adapt itself strictly to the shape of the expansion mould.

The articles produced in this manner exhibit various drawbacks, their shape in particular changing within 1-2 years, and if the mass be cut through before the end of such period the cut surface will bulge.

The invention hereinafter described relates to a manufacturing method which precludes these drawbacks.

The invention is characterized in that the first vulcanization under the high gas pressure aforesaid is not carried to completion, and that after expansion the expanded cellular mass is subjected—usually in a mould—to a different heating from that mentioned above, inasmuch as the conditions of temperature, external pressure and duration are such that, at the end of the operation, the cellular mass has undergone a supplementary vulcanization, and that, at ordinary temperature, the pressure in the interior of the cells is substantially equal to that of the atmosphere.

The cellular rubber and ebonite produced in this manner have assumed a form which remains constant and it may be considered as stabilized.

The explanation of this result is as follows:—

In the cellular rubber prepared by the old processes aforesaid, a considerable gaseous pressure prevails—even after the expansion of the mass—in the cells, the walls of which are under tension, and since the rubber mass is not entirely impermeable to these imprisoned gases, the latter gradually escape thus producing the changes in shape sustained by the article in the course of time. When a cut is made in the mass this high pressure causes the cut surface to bulge in consequence of the cells in the vicinity of the new surface. On the other hand, if the heating is performed in such a manner as to cause the gas, which is imprisoned in the cells, to diffuse throughout the mass with a pressure that, at the ordinary temperature, will be approximately equal to atmospheric pressure, and if the rubber be also subjected to a supplementary vulcanization which will free it from tension stresses in its new condition, the causes of the aforesaid drawbacks will be removed.

This supplementary vulcanization ought usually to be performed in a mould in which the final expansion of the article can take place.

The temperature, pressure and duration of this operation may vary within wide limits, and will depend chiefly on the nature of the rubber mixture, the extent of the primary vulcanization etc., whilst permitting the attainment of the two results specified, cellular pressure being equal, at ordinary temperature, to that of the atmosphere, and supplementary vulcanization of the rubber. These two results may be accomplished simultaneously or successively; the heated rubber is able to complete its expansion, so that, having no initial tension, the rubber will gradually recover its nerve, i. e. elasticity, within the usual period of 1-2 months.

The temperature may vary between 35 and 150° C., and the time between 1 and 4 hours. As regards external pressure, it is particularly advantageous to operate under a certain negative pressure, since in this way the expansion of the rubber during the heating can be considerably increased, so that a rubber or ebonite of very low density, such as 0.05 can be obtained.

Experience is the sole guide to determine the temperature and duration of the second vulcanizing treatment in the expanded condition for each rubber composition employed. Moreover, it is also necessary in this connection that the temperature and duration of the primary vulcanization in the atmosphere of high-pressure gas should themselves be well defined (which is easy to control) and that the conditions of temperature to which the articles are exposed before and after the first removal from the mould should be always the same which, owing to the variations in the temperature of the surrounding air—chiefly from one season or another—is not always the case.

To remedy this last inconvenience and standardize the conditions of treatment, the invention is completed by the fact that, on issuing from the high pressure autoclave in which the primary vulcanization is effected, the articles are placed in a cold chamber with a constant temperature, where they are left up to the time they are subjected to expansion and the second vulcanization.

This sojourn in the cold chamber comprises another advantage. The articles taken out of the autoclave in their mandrels or multiple moulds, each containing a large number of rough castings, exert a powerful pressure on said moulds, a circumstance which makes opening the moulds a delicate and sometimes dangerous operation. This task is facilitated by the cooling of the laden mould.

As already mentioned, the conditions under which the second vulcanization is performed vary considerably with the articles and the formulæ of their composition. The following may be cited by way of example.

Cellular rubber is made in long sheets, for example, 7 metres in length, 1.20 metres wide and 1 centimetre thick, to serve, for example, as floor covering for bathrooms. On issuing from the autoclave in which the primary vulcanization is performed in the presence of a gas under high pressure, such sheets will be immersed for 5-10 minutes in water at a temperature between 30 and 80° C., according to the composition of the mixture. They are then fixed by completing the vulcanization in a hot press, the plates of which are spaced in accordance with the degree of expansion desired for a period ranging—according to the mixture, thickness, etc.—from 30 minutes to 4 hours and at a vulcanizing temperature of 125-150° C.

In making toys, such dolls or animals, the roughly moulded article is cooked in a suitable mould in the autoclave under gas pressure. On leaving the autoclave and being taken out of the mould, the articles are placed in a bath of hot air—70-90° C.—to expand, and are then fixed in a mould of the final dimensions which is heated in a steam bath to vulcanizing temperature (120-160° C.) for a period of 10 minutes to 4 hours, according to the mixture and bulk.

To manufacture a plate of cellular ebonite, a piece of cellular rubber of corresponding size, treated as in the preceding paragraph, is taken, and vulcanization is completed between the plates of a hot press during, for example, 1 to 4 hours, at a temperature of about 100 to 140° C.

The fixed rubber and ebonite obtained by the above process may attain very low densities, such as 0.05 as the result of their high expansion.

This vulcanization in two stages permits also when compared with the old process, in which the vulcanization is performed entirely at one time, a number of improvements, of which two of the most important will be hereinafter described. When the thickness of all the parts of the blank is not regular, the penetration of the gas and the formation of the gas containing cells cannot be made homogeneously. According to the first improvement, it is possible to avoid such drawback in the following way.

Instead of making the entire blank of the article from one piece of crude rubber, said article is formed with a plurality of elements having received the first partial vulcanization and the following expansion and being such that all of them are of homogeneous cellular rubber; the article formed in this manner, by assembling such homogeneous elements, will be itself homogeneous in all its parts, whatever may be the thickness of those different parts. It is an article thus formed that is subjected, generally in a suitable mould, to the supplementary vulcanization which solders intimately together the different elements, and brings it, without destroying its homogeneity, at the so-called "stabilized" state that is desirable, in the form of rubber or ebonite, according to requirements.

It is possible, for instance, in an autoclave to make cellular elements of rubber of simple geometrical form: plates, cylinders, spheres or the like; with such elements, especially with the plates, partially vulcanized and expanded, it will be possible, after having them cut and shaped (especially by mere juxtaposition of several coats), to obtain articles the thickness of which varies in their different parts, or also articles of different forms such as parallelepipedical vats, of cellular rubber or ebonite to be used as ice containing vessels.

In the case when it will not be necessary to bring the material to the stabilized state, it may be possible to stop heating as soon as the elements would be soldered and thus to obtain however the aforesaid advantage of homogenousness.

The manufacture of elements of cellular rubber, homogenous between them, will be performed without need of particular precaution if the rough materials are crude elements of the same shape and thickness treated simultaneously in the autoclave. But it will be also possible to obtain, without difficulty, homogeneous elements of different shapes and thicknesses after different operations in the autoclave by varying, according to the kind of elements, the temperature and duration of the preliminary vulcanization and following expansion.

From this vulcanization in two stages, comes another advantage, being that the number of moulds of various forms to be used in the autoclave may be reduced because it will be sufficient to store in different forms the moulds used for the supplementary vulcanization, and thereby secure a serious saving. Moreover, a mould such for instance, as this for a relatively deep vat, occupies in the autoclave a large place for a very small effective volume of rubber and, the working of the autoclave being very expensive while its capacity is very reduced, it is of interest that the capacity of said autoclave should be utilized at the best; this result is obtained with moulds for elements of simple geometrical forms, particularly the moulds for plates, balls, rolls, etc., while it would not be so with moulds of various forms such as moulds for vats.

The second improvement consists in the supplementary vulcanization being effected so as to destroy the homogeneousness in their depth of the above mentioned articles or of other articles of the same material, as hereinafter explained for particular purposes.

The nature and interest of this characteristic will be clearly understood when considering, for instance, the case of a vat in cellular rubber to be employed inside of the parallelepipedical box of an ice-containing vessel, the internal and external faces of the vat will be at different temperatures, and, if the vat is made of homogeneous material, it will warp. On the contrary, according to the invention, if the layers forming the faces are such that the gas pressure in their cells be different, it will be possible to obtain, with a choice of convenient gas pressure, that the dilatations of said layers be the same at the different temperatures to which they are subjected. For another instance, the box itself of the ice container may be made of cellular ebonite. The aforesaid drawback resulting from the difference of the temperatures on the faces will be the more noticeable as the difference between the temperatures of both faces of the ebonite plates will be greater than in the case of the rubber packing located inside of the box constituting the ice-container. This may be prevented, according to the second improvement by performing the supplementary vulcanization (by a rapid heating for instance) so as to ebonify only both faces of the plate leaving between them a layer of material still in the state of resilient cellular rubber. Thus, in fact, two boxes of cellular ebonite will be obtained fitted one in another and connected on their whole internal faces area by a layer of cellular rubber more or less resilient in order that the differences of dilatation of the internal and external faces of the vat will not bring any disadvantage, since both rigid ebonite boxes are allowed to move slightly one in respect to the other due to their connection constituted by the layer of resilient rubber.

By way of example, a form of execution of an ice containing box of cellular rubber or ebonite has been hereinafter described in conjunction with the accompanying drawing.

This ice containing box, in the shape of a cubic vat 1, 2, 3, 4—5, 6, 7, 8 will be constituted by assembling three elementary plates 9, 10 and 11 of cellular rubber, homogeneous between them, having been previously subjected to the first vulcanization and following expansion.

By treating directly in an autoclave the mould for a crude rubber blank which, after expansion, would give a relatively deep vat with thick walls such as this of expanded cellular rubber here shown, the double disadvantage would appear that the place in the autoclave will not be properly employed and that the material will not be homogeneous.

The assembling is made for instance in the following manner.

Figure 1:
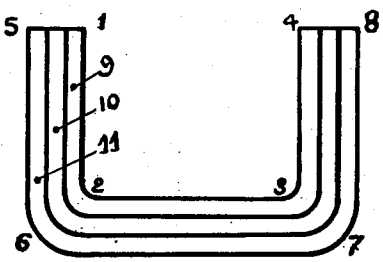
Figure 1 is a vertical section of a box.
Figure 2:
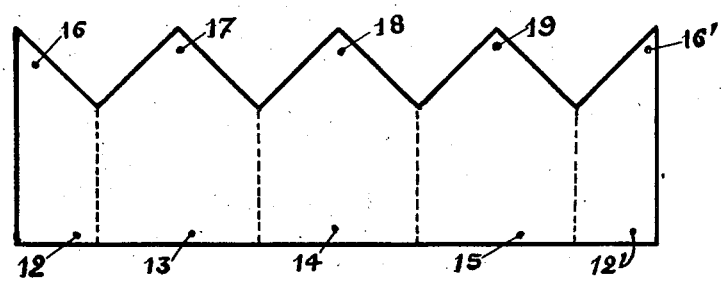
Figure 2 shows the unfolding of the inside plate.
Figure 3:
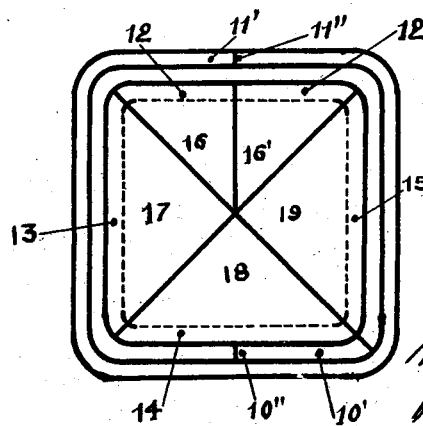
Figure 3 is a view of the box from the rear, the bottom of the median and outside plates having been taken away.

The plate 9 is cut as shown in Figure 2, thus it forms the four-side faces of the vat 12, 12'—13—14—15 ending in points 16, 16'—17—18—19 which, after being folded as shown in Figure 3, will constitute the bottom. The other layers 10 and 11 may be formed for instance (Figure 3), one of a rectangular plate 10' folded on the sides of the vat and soldered on both its ends at 10''—and the other of a rectangular plate 11' similarly folded and soldered at 11'', these plates being completed with two flat bottoms (not shown in Figure 3) soldered therewith.

This assembling having been made with elementary plates of cellular rubber previously partially vulcanized and expanded, the blank is located in a suitable mould and subjected to the supplementary vulcanization which solders intimately the different parts and brings the article to the desirable stabilized state.

According to the conduct of the heating during the supplementary vulcanization and also to the kind of rubber employed, it will be possible to obtain at will, either a vat of cellular rubber of which the internal 1, 2, 3, 4 and external 5, 6, 7, 8 faces will be of two different stabilized states, therefore possessing different dilatations, or a vat of which the internal and external faces will be ebonified while the inner layer remains in the state of more or less resilient rubber.

It is possible to solder the elements of cellular rubber only from the fact that these elements are in a state of non complete vulcanization, so that the ulterior heating, under a temperature sufficient to finish the vulcanization, brings the rubber to the pasty state necessary for the soldering, without risking burning it, which would happen in case use is made of elements completely vulcanized.

It is also possible to employ the soldering process according to the invention for the manufacture of the following new articles.

Cellular rubber elements having been already subjected to the first partial vulcanization and following expansion, are assembled with elements of a different nature, for instance metal, non cellular ebonite, clothes or the like, with, in the case of a metal, interposition of a coat of binding material such as a solution of rubber in benzine, and then this ensemble is subjected to the supplementary vulcanization.

Among the principal articles which may be manufactured according to the process of the invention, the following may be noted.

Plates of closed cells cellular rubber or ebonite will be sheathed, either inside, or outside, or at the same time both inside and outside, by means of plates of different materials, for instance rigid and thin, particularly metallic plates, full or foraminous, wire mesh, non cellular ebonite plates, and cloths. When the sheath is made of metallic plates, it will be of advantage to coat the metal previously scoured with a solution of rubber in a solvent in order to have a strong adhesion between the metal and the rubber. The rubber solution ought to be such that it will be completely vulcanized under the conditions of temperature and duration required for the supplementary vulcanization of the treated article. The sheathed plates thus constituted may be used as insulating elements against heat, sound or electrical effects, for instance as separating walls, floors, roofs.

Metallic tubes will receive internally or externally a coating of cellular rubber or ebonite of the desired thickness. In that way, it is possible to manufacture for instance metallic tubes externally insulated against heat for the conduct of cold or warm fluid, more particularly in the cold producing or keeping devices, or metallic tubes such as frame posts of airplane filled with cellular ebonite so as to reinforce their strength without increasing substantially their weight, or bars of cellular ebonite strengthened by a sheath constituted of a metallic rod, or metallic tubes provided internally with a coating of cellular rubber or ebonite, so as to serve as covers for electrical conductors.

It is of interest to note that the coating of a solution of rubber in benzine, or a similar solvent, ensures a very hard adhesion of the cellular rubber or ebonite on the previously scoured metal. In an experiment, the inventor has obtained an adhesion of 1 kilog per cm$^2$. This fact allows to settle in walls or other articles of thus sheathed cellular rubber or ebonite, supporting or fixing devices which may be subjected to considerable stress.

What I claim is:

1. Process for the manufacture of articles of cellular rubber and ebonite with closed cells comprising an incomplete vulcanization in an autoclave charged with a gas under high pressure of the rough casting of crude rubber mixture contained in a mould, removing same from the autoclave and taking it out of the mould, whereupon it expands, heating in such a way as to produce a supplementary vulcanization and to bring the pressure in the interior of the cells to such a level that, on being brought back to ordinary temperature, it will be substantially equal to the pressure of the atmosphere.

2. Process according to claim 1, in which the heating in the supplementary vulcanization is effected in a certain vacuum allowing the mass to increase in bulk.

3. Process for the manufacture of articles such as sheets and bathroom floor coverings in cellular rubber with closed cells, according to claim 1, in which, after the expansion which succeeds the removal from the mould after leaving the autoclave, the sheet is immersed for about 5–10 minutes in water at a temperature of 35–80° C. and is then subjected to supplementary vulcanization and fixing in a hot press, the plates of which are spaced in accordance with the degree of expansion desired.

4. Process for the manufacture of toys, such as dolls or animals, of cellular rubber with closed cells, according to claim 1, in which, after the expansion which follows removal from the mould on leaving the autoclave, the toy is exposed in an air bath at 60–90° C. for 15–60 minutes, and is then subjected to supplementary vulcanization and fixing with expansion in a mould.

5. Process for the manufacture of articles such as plates of cellular ebonite, with closed cells, according to claim 1, in which, after the expansion following removal from the mould on leaving the autoclave, the rough plate is immersed, for 5–10 minutes, in water at 35–80° C. and then subjected to the supplementary vulcanization until hardened to the fixed condition in a hot press, the plates of which are spaced in accordance with the degree of expansion desired.

6. Process according to claim 1, in which the mould is placed in a cold chamber for a certain time on issuing from the autoclave.

7. Process for the manufacture of articles of cellular rubber and ebonite with closed cells such as plates and tubes sheathed with metal, non-cellular ebonite, clothes, comprising a first partial vulcanization of the crude rubber in a mould in an autoclave charged with a gas under high pressure, a following expansion, the assembling with the elements constituting the sheath, a supplementary vulcanization bringing the rubber material of the article to the state of fixing desired.

8. Process for the manufacture of articles of cellular rubber and ebonite with closed cells, such as plates and tubes sheathed with metal comprising a first partial vulcanization of the crude rubber in a mould in an autoclave charged with a gas under high pressure, a following expansion, the coating of the metal with a solution of rubber into a solvent, the assembling of the expanded rubber with the metal, a supplementary vulcanization bringing the rubber material of the article to the state of fixing desired and vulcanizing the rubber of the solution.

9. Process according to claim 1, wherein the supplemental vulcanization is carried on in such manner as to produce in the rubber mass a superficial layer in which the gaseous pressure of the cells differs from that of the deep layer.

10. Process according to claim 1 in which the supplemental vulcanization is carried on in such manner as to produce in the rubber mass ebonification of the surface, while the deep layer remains in the state of flexible rubber.

MAURICE PAUL HENRI LEON RAEPSAET.